United States Patent
An et al.

(10) Patent No.: US 8,981,890 B2
(45) Date of Patent: Mar. 17, 2015

(54) NON-MAGNETIC COMPOSITION FOR MULTILAYER ELECTRONIC COMPONENT, MULTILAYER ELECTRONIC COMPONENT MANUFACTURED BY USING THE SAME AND MANUFACTURING METHOD THEREOF

(75) Inventors: Sung Yong An, Gyunggi-do (KR); Min Kyoung Cheon, Gyunggi-do (KR); Ho Yoon Kim, Gyunggi-do (KR); Young Il Lee, Gyunggi-do (KR); Myeong Gi Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 5 days.

(21) Appl. No.: 13/585,256

(22) Filed: Aug. 14, 2012

(65) Prior Publication Data

US 2013/0321118 A1    Dec. 5, 2013

(30) Foreign Application Priority Data

May 30, 2012    (KR) .......................... 10-2012-0057333

(51) Int. Cl.
*H01F 5/00*    (2006.01)
*H01F 27/30*    (2006.01)
(Continued)

(52) U.S. Cl.
CPC *H01F 3/14* (2013.01); *B32B 18/00* (2013.01); *C01G 23/003* (2013.01);
(Continued)

(58) Field of Classification Search
CPC .......... H01F 2017/0066; H01F 10/187; H01F 10/193; H01F 1/0045; H01F 1/33; H01F 27/55; H01F 1/344; H01L 23/645

USPC ......... 336/199, 200, 212, 221, 232; 29/602.1; 257/531; 501/26, 67, 69; 252/62.51 R, 252/62.58, 62.59, 63.2
See application file for complete search history.

(56) References Cited

U.S. PATENT DOCUMENTS 5,476,728 A * 12/1995 Nakano et al. ................ 428/815
5,479,695 A * 1/1996 Grader et al. ................ 29/602.1
(Continued)

FOREIGN PATENT DOCUMENTS

JP    2009-007195 A    1/2009
KR    10-2009-0033378 A    4/2009
(Continued)

OTHER PUBLICATIONS

Korean Office Action, w/ English translation thereof, issued in Korean Patent Application No. KR 10-2012-0057333 dated Sep. 24, 2013.
(Continued)

*Primary Examiner* — Alexander Talpalatski
*Assistant Examiner* — Joselito Baisa
(74) *Attorney, Agent, or Firm* — McDermott Will & Emery LLP

(57) ABSTRACT

There are provided a non-magnetic composition for a ceramic electronic component, a ceramic electronic component manufactured by using the same, and a manufacturing method thereof. The non-magnetic composition for a ceramic electronic component includes a compound represented by $ZnCuTiO_4$ such that the inductance decreasing rate at the high current and the capacitance rate of change of the magnetic body after the application of current according to the temperature change are insensitive, whereby the stable operational characteristics of the ceramic electronic component may be secured.

6 Claims, 6 Drawing Sheets

(51) Int. Cl.
*H01L 27/08* (2006.01)
*C03C 8/04* (2006.01)
*B32B 18/00* (2006.01)
*C01G 23/00* (2006.01)
*C04B 35/462* (2006.01)
*H01F 3/14* (2006.01)
*H01F 17/00* (2006.01)
*H01F 41/04* (2006.01)
*H01F 27/29* (2006.01)

(52) U.S. Cl.
CPC ...... C04B 35/462 (2013.01); *C04B 2235/3281* (2013.01); *C04B 2235/3284* (2013.01); *C04B 2235/5445* (2013.01); *C04B 2235/77* (2013.01); *C04B 2235/9615* (2013.01); *C04B 2237/34* (2013.01); *C04B 2237/346* (2013.01); H01F 17/0013 (2013.01); *H01F 17/0033* (2013.01); *H01F 27/292* (2013.01); H01F 41/046 (2013.01)
USPC ............. 336/200; 336/199; 257/531; 501/26

(56) References Cited

U.S. PATENT DOCUMENTS

| | | | |
|---|---|---|---|
| 7,671,715 B2* | 3/2010 | Iwase | 336/200 |
| 8,004,381 B2* | 8/2011 | Katayama et al. | 336/200 |
| 8,018,313 B2* | 9/2011 | Tada et al. | 336/200 |
| 2007/0182519 A1* | 8/2007 | Tsuzuki et al. | 336/200 |
| 2010/0165510 A1* | 7/2010 | Takahashi et al. | 360/135 |
| 2010/0283447 A1 | 11/2010 | Tachibana et al. | |
| 2012/0119866 A1 | 5/2012 | Kim et al. | |

FOREIGN PATENT DOCUMENTS

KR 10-2010-0094456 A 8/2010
KR 10-2012-0052817 A 5/2012

OTHER PUBLICATIONS

M.P. Tare et al., "Structural and electrical study of $ZnCuTiO_4$, $ZnCuSnO_4$, and $ZnCuGeO_4$ synthesised using metallic copper," Bull. Mater. Sci., vol. 13, No. 3, Jun. 1990, pp. 191-195.
Japanese Office Action issued in Japanese Patent Application No. JP 2012-179710 dated May 7, 2014.

* cited by examiner

NON-MAGNETIC COMPOSITION FOR MULTILAYER ELECTRONIC COMPONENT, MULTILAYER ELECTRONIC COMPONENT MANUFACTURED BY USING THE SAME AND MANUFACTURING METHOD THEREOF

CROSS-REFERENCE TO RELATED APPLICATIONS

This application claims the priority of Korean Patent Application No. 10-2012-0057333 filed on May 30, 2012, in the Korean Intellectual Property Office, the disclosure of which is incorporated herein by reference.

BACKGROUND OF THE INVENTION

1. Field of the Invention

The present invention relates to a non-magnetic composition for a multilayer electronic component, capable of improving bias characteristics thereof, a multilayer electronic component manufactured by using the same, and a manufacturing method thereof.

2. Description of the Related Art

An inductor is a main passive element included in an electronic circuit, and may be used in a component, or the like, for removing noise or constituting an LC resonance circuit.

Among inductors, as a chip element mainly used in a power circuit such as a direct current (DC) to DC converter in a portable device, there is provided a power inductor.

A power inductor having a small size, high current throughput, low DC resistance, and the like, has mainly been recently developed, and has required that a change in an inductance value for a use current is small, and particularly, has required an operation to be well performed, regardless of temperature, and that a change in an inductance value after an application of current according to a temperature change is small.

The inductor may be classified as a winding inductor, a multilayer inductor, a thin film inductor, and the like, according to a structure thereof.

Among these, the winding type inductor manufactured by winding a coil around, or printing the coil on, a ferrite core and forming electrodes at both ends thereof, has a small change in an inductance value according to an application of current, but has a limitation in miniaturization and a decrease in thickness due to a structure thereof, such that it is not suitable for the power inductor.

On the other hand, the multilayer inductor has a structure in which it includes a plurality of magnetic layers formed of a plurality of ferrites, a low-k dielectric material, or the like, internal electrode layers formed by forming conductive patterns on each of the magnetic layers, electrically connected to each other by via electrodes, and multilayered in a thickness direction, and external terminals formed on an external surface of the multilayered body and connected to the internal electrode layers.

That is, in the multilayer inductor, since the coil is surrounded by the magnetic material such as a ferrite, when a high current is applied to the coil, the magnetic material around the coil is magnetized, such that a change in the inductance value thereof is larger than that of a winding inductor.

However, since the multilayer inductor is advantageous for miniaturization and a decrease in a thickness, as compared to the winding type inductor, it has been mainly used for the power inductor. Recently, research into a technology of decreasing a rate of change in an inductance value has been continuously conducted.

In order to improve the defects thereof, a non-magnetic layer is included in the multilayer inductor to cut a magnetic flux, thereby partially improving change characteristics in an inductance value according to an application of current.

However, in the multilayer inductor according to the related art, since zinc-ferrite (Zn-ferrite) of which a portion is substituted with copper (Cu) is used as a material of a non-magnetic layer, temperature characteristics thereof may be easily changed due to diffusion according to temperature, such that a change in the inductance value after the application of current according to the temperature change is still high.

The following Related Art Document 1 discloses a multilayer inductor including a non-magnetic layer containing $Fe_2O_3$, $ZnO$, and $CuO$, and the following Related Art Document 2 discloses an electrical insulating magnetic gap layer. Neither of Related Art Documents 1 and 2 discloses a non-magnetic layer including a compound represented by $ZnCuTiO_4$.

RELATED ART DOCUMENTS

US Patent Laid-Open Publication No. 20100283447 (Nov. 11, 2010)
Korean Patent Laid-Open Publication No. 2009-0033378 (Apr. 2, 2009)

SUMMARY OF THE INVENTION

An aspect of the present invention provides a non-magnetic composition for a multilayer electronic component capable of securing stable operational characteristics of a ceramic electronic component by allowing a rate of change in capacitance of a magnetic body to be insensitive to a temperature change after the application of current thereto, a multilayer electronic component manufactured by using the same, and a manufacturing method thereof.

According to an aspect of the present invention, there is provided a non-magnetic composition for a ceramic electronic component including a compound represented by $ZnCuTiO_4$.

The compound may include 10 to 50 mol % of zinc oxide (ZnO), 20 to 45 mol % of copper oxide (CuO), and 30 to 45 mol % of titanium dioxide ($TiO_2$).

An average particle size of the titanium dioxide may be 0.2 μm or less.

According to another aspect of the present invention, there is provided a ceramic electronic component including: a ceramic body having a plurality of magnetic layers multilayered therein; internal electrode layers formed in the ceramic body; a non-magnetic layer inserted into at least one position between the magnetic layers and including a compound represented by $ZnCuTiO_4$; and external electrodes formed on external surfaces of the ceramic body and electrically connected to the internal electrode layers.

The internal electrode layers and the external electrodes may be formed of a material including silver (Ag) or copper (Cu).

According to another aspect of the present invention, there is provided a manufacturing method of a ceramic electronic component, including: preparing a plurality of magnetic layers; preparing non-magnetic layers including a compound represented by $ZnCuTiO_4$; forming internal electrode layers on the magnetic materials, respectively; inserting the non-magnetic layer into at least one position between the magnetic layers to form a multilayered body; firing the multilayered body to form a ceramic body; and forming external electrodes on external surfaces of the ceramic body so as to be electrically connected to the internal electrode layers.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
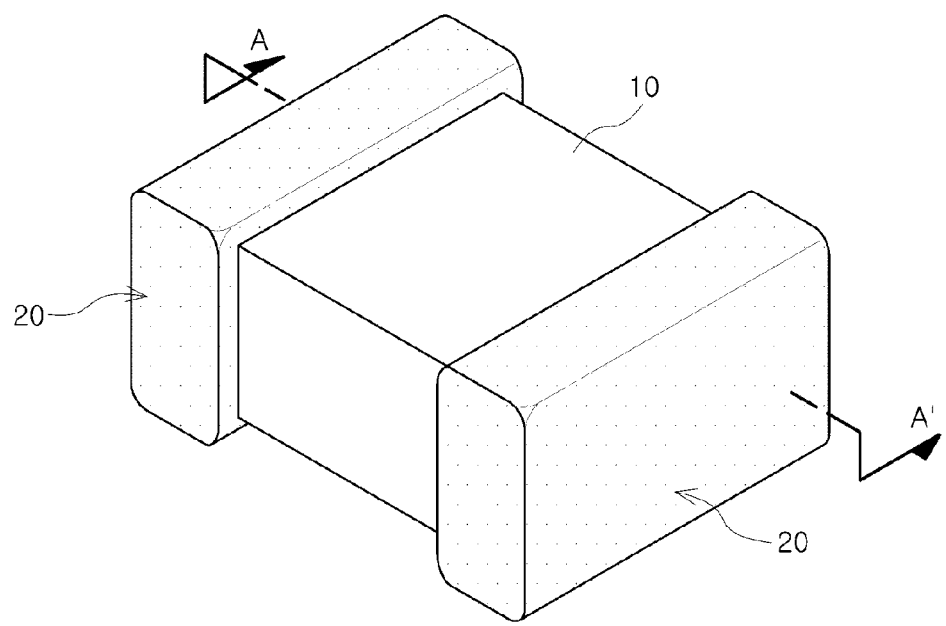
FIG. 1 is a perspective view showing a ceramic electronic component according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the concept of the invention to those skilled in the art.

Therefore, in the drawings, the shapes and dimensions may be exaggerated for clarity, and the same reference numerals will be used throughout to designate the same or like components.

In manufacturing a ceramic electronic component, a non-magnetic layer may be inserted between magnetic layers in order to obtain a magnetic field blocking effect. The non-magnetic layer used according to the related art may be formed of a $ZnCuFe_2O_4$-based material and have CuO added thereto for sintering adhesion with the magnetic layer.

However, due to CuO added for securing the sintering adhesion, $CuFe_2O_4$ having magnetic properties may be produced by an amount of added Cu, such that the non-magnetic layer may have magnetic behavior.

Therefore, due to the magnetic behavior, the ability of the non-magnetic layer to block the magnetic field generated at the time of the application of current in the ceramic electronic component is deteriorated, such that direct current (DC) bias characteristics are deteriorated. In addition, the non-magnetic layer has temperature characteristics changed due to diffusion according to temperature, such that a change in an inductance value according to the temperature change is large, whereby temperature safety of the ceramic electronic component is deteriorated.

In connection to this, pure $ZnFe_2O_4$ has a structure in which a crystal structure is spinel and a lattice constant thereof is similar as that of NiZnCu ferrite used in the multilayer power inductor. Since pure $ZnFe_2O_4$ has a ferrite structure, it may be used in the case in which sintering temperature thereof is similar to that of the ceramic body.

Meanwhile, $ZnFe_2O_4$ has a Curie temperature of 35K or below, such that it is a non-magnetic material at a temperature of 290K, approximately room temperature, but may not be sintered at 900° C. Therefore, the sinterability of $ZnFe_2O_4$ may be improved by adding a glass which is a sintering agent thereto, or decreasing the content of $Fe_2O_3$ to be 49 mol % and substituting a portion of $ZnFe_2O_4$ with CuO.

However, in the case in which a portion of $ZnFe_2O_4$ is substituted with CuO, an added amount of CuO may be increased, according to a substituted amount thereof, to increase the Curie temperature together therewith. At the time of firing a CuZn ferrite having a Curie temperature around room temperature, Ni diffuses toward the non-magnetic layer, such that a magnetized portion is generated to actually decrease the thickness of the non-magnetic layer, which causes a decrease in the DC-bias.

For example, in a case in which the non-magnetic layer having the Curie temperature of −10° C. is used, when the DC-bias is measured at −30° C., this temperature is lower than the Curie temperature of the non-magnetic layer, such that the non-magnetic layer has magnetism. Therefore, a non-magnetic effect disappears, such that the inductance value is also increased. As a result, DC-bias measured at −30° C. will be largely decreased as compared to DC-bias at the time of designing thereof.

The non-magnetic composition for a ceramic electronic component according to one embodiment of the present invention may include a compound represented by $ZnCuTiO_4$, which may improve the defects as described above.

Since the compound represented by $ZnCuTiO_4$ is a spinel type completely non-magnetic composition not having magnetic characteristics, a flow of a magnetic field generated at the time of application of current to the ceramic electronic component is blocked, such that a rate of change in capacitance of a magnetic body is insensitive to an increase in current applied thereto, thereby securing stable operation characteristics in the ceramic electronic component.

Whether or not an unpaired electron, the cause of magnetic characteristics of a material being exhibited in an electron configuration of an atom or an ion, is present may be determined by measuring magnetic moment of the material.

Among them, ZnO and $TiO_2$ which are oxides of Zn and Ti, are mixed at a relatively low temperature to synthesize a compound having a structure of $ZnCuTiO_4$. In this case, the magnetic moment is 0, which shows completely non-magnetic characteristics, resulting in an effect of blocking the magnetic field.

In addition, in the compound represented by $ZnCuTiO_4$ according to the embodiment of the present invention, the zinc (Zn) metal element may control diffusion of a titanium oxide ($TiO_4$) component, and include zinc (Zn) the same as a magnetic layer material to secure a sintering adhesion according to the same kind of material.

The compound may be powder, and be prepared by mixing and calcinating zinc oxide (ZnO) and titanium dioxide ($TiO_2$).

In this case, the compound may be prepared by a reaction of 10 to 50 mol % of zinc oxide (ZnO), 20 to 45 mol % of copper oxide (CuO), and 30 to 45 mol % of titanium dioxide ($TiO_2$). An average particle size of the titanium dioxide may be 0.2 μm or less.

Meanwhile, the non-magnetic composition for the ceramic electronic component may further include a sintering agent in order to bond the magnetic layer to achieve contraction behavior conformity at the time of co-sintering.

Even when the sintering agent is added to the non-magnetic compositing including the compound represented by ZnCu- TiO$_4$ according to the embodiment of the present invention, the composition does not have the magnetic characteristics to improve the DC bias characteristics.

In addition, by adding the sintering agent, the interface adhesion with the magnetic layer may be controlled to effectively prevent peeling between the magnetic layer and the non-magnetic layer which affects a yield of the ceramic electronic component.

The ceramic electronic component to which the non-magnetic composition of the present invention is applied may be any one chip element of a chip inductor, a chip bead, a power inductor, a chip antenna, or a chip LC filter.

Figure 2:
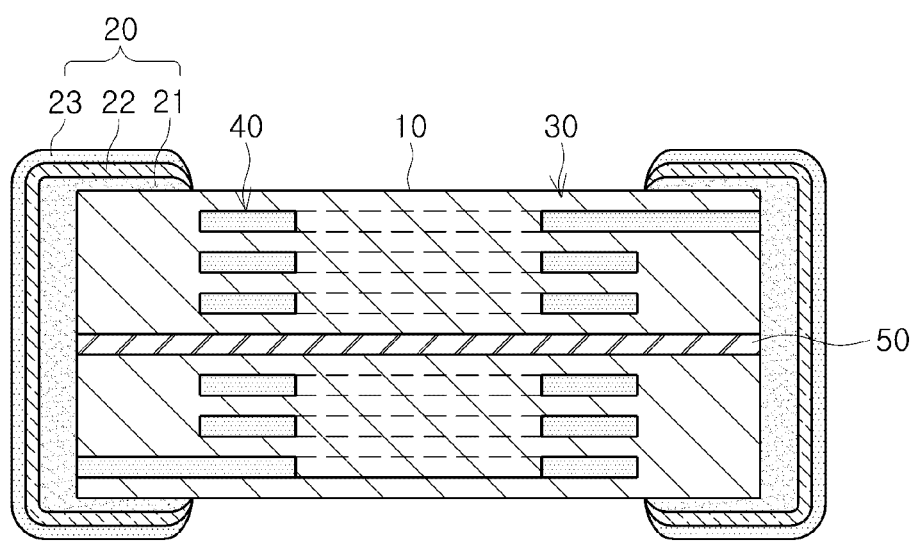
FIG. 2 is a cross-sectional view taken along line A-A' of FIG. 1.

FIG. 1 is a perspective view showing a multilayer power inductor according to an embodiment of the present invention, and FIG. 2 is a cross-sectional view taken along line A-A' of FIG. 1.

Hereinafter, the multilayer ceramic power inductor will be described as an example of the ceramic electronic component with reference to FIGS. 1 and 2.

The multilayer power inductor according to the embodiment of the present invention may include a ceramic body 10 having a plurality of magnetic layers 30 multilayered therein, internal electrode layers 40 formed in the ceramic body 10, a non-magnetic layer 50 inserted between the magnetic layers 30 and including the compound represented by ZnCuTiO$_4$, and external electrodes 20 formed on external surfaces of the ceramic body 10 and electrically connected to the internal electrode layers 40.

The internal electrode layer 40 and the external electrode 20 may be formed of a conductive metal material, for example, a material including silver (Ag) or copper (Cu), but the present invention is not limited thereto.

In addition, the external electrode 20 may include an external terminal 21 including silver (Ag) and a glass which is a sintering agent, and may further include a nickel (Ni) layer 22 and tin (Sn) layer 23 as plating layers sequentially formed on an outer surface thereof.

A multilayer power inductor of the related art forms a non-magnetic layer as ZnCu ferrite, such that a nickel component included in the NiZnCu ferrite which is a material of the ceramic body may be diffused into the non-magnetic layer, and the Zn component of the non-magnetic layer may be diffused into the ceramic body, thereby allowing a thickness of the non-magnetic layer to be reduced, and deteriorating the DC-bias characteristics of the multilayer power inductor.

Therefore, since the non-magnetic layer needs to be thickened in order to improve the DC-bias characteristics of the multilayer power, a thickness of a sheet of the non-magnetic layer injected before a sintering process needs to be relatively large. However, in this case, the entire thickness of the multilayer power inductor may be thickened.

In addition, the multilayer power inductor of the related art having the above-mentioned structure may block magnetic flux having a predetermined level; however, at the time of sintering, delamination may be generated due to a difference of a shrinkage rate with a ferrite basic material included in the ceramic body, and stress may be generated in the multilayer power inductor.

In addition, in the multilayer power inductor of the related art, bias-TCL characteristics may be deteriorated due to diffusion of the non-magnetic layer.

However, the non-magnetic layer 50 according to the embodiment of the present invention may include the compound represented by ZnCuTiO$_4$.

In this case, the compound included in the non-magnetic layer 50 may include 10 to 50 mol % of zinc oxide (ZnO), 20 to 45 mol % of copper oxide (CuO), and 30 to 45 mol % of titanium dioxide (TiO$_2$).

A composition ratio of the compound included in the non-magnetic layer 50 allows a density value and a sintering shrinkage rate thereof to be matched to those of the NiZuCu ferrite which is a material of the ceramic body. The sintering shrinkage rate of the multilayer power inductor according to the related art is about 15 to 20%. In the case of the composition ratio according to the embodiment of the present invention, the sintering shrinkage rate may be maintained to be 15% or more similar to that of the multilayer power inductor according to the related art.

Table 1 below shows permeability at 1 MHz, a Q value, density, and a shrinkage rate of a toroidal core fired at 900° C. according to the embodiment of the present invention.

In this case, for average particle sizes of ZnO and CuO of the compound, raw materials having a particle size distribution of 0.5 to 5 μm may be used. In the case in which the average particle size of titanium dioxide is 0.2 μm or less, a shrinkage rate thereof of 15% or more was evident.

TABLE 1

| Sintering Temperature | Sample | Composition (mol %) | | | Permeability | Q | Density | Shrinkage Rate |
| --- | --- | --- | --- | --- | --- | --- | --- | --- |
| | | Zn | Cu | Ti | | | | |
| 900 | Inventive Example 1 | 25 | 30 | 45 | 3.20 | 34.68 | 4.76 | 17.38 |
| | Inventive Example 2 | 20 | 35 | 45 | 3.39 | 35.78 | 4.89 | 17.15 |
| | Inventive Example 3 | 15 | 40 | 45 | 3.38 | 37.11 | 4.90 | 17.93 |
| | Inventive Example 4 | 10 | 45 | 45 | 3.44 | 36.48 | 4.92 | 17.60 |
| | Inventive Example 5 | 25 | 40 | 35 | 3.20 | 31.80 | 5.72 | 20.30 |
| | Inventive Example 6 | 33.3 | 33.3 | 33.4 | 3.21 | 30.33 | 5.09 | 20.18 |
| | Inventive Example 7 | 30 | 35 | 35 | 3.12 | 29.48 | 5.06 | 20.08 |
| | Inventive Example 8 | 35 | 30 | 35 | 3.17 | 31.13 | 5.05 | 20.85 |
| | Inventive Example 9 | 40 | 25 | 35 | 3.40 | 27.9 | 4.69 | 16.40 |
| | Inventive Example 10 | 45 | 20 | 35 | 3.30 | 27.8 | 4.43 | 15.20 |

TABLE 1-continued

| Sintering Temperature | Sample | Composition (mol %) | | | Permeability | Q | Density | Shrinkage Rate |
|---|---|---|---|---|---|---|---|---|
| | | Zn | Cu | Ti | | | | |
| | Inventive Example 11 | 45 | 25 | 30 | 3.50 | 27.2 | 4.90 | 16.95 |
| | Inventive Example 12 | 50 | 20 | 30 | 3.50 | 28.2 | 5.03 | 17.75 |

It can be appreciated from Table 1 that all of Inventive Examples 1 to 12 had a permeability of 4 or less, which showed non-magnetic characteristics, and had a shrinkage rate of 15% or more, which showed relatively excellent characteristics.

Therefore, in the multilayer power inductor according to the embodiment of the present invention, a magnetic flux propagation path may be dispersed in the coil formed of the internal electrode layer 40 to suppress magnetization at high current, thereby improving a change in the inductance L value according to the application of current.

That is, the multilayer power inductor according to the embodiment of the present invention may control the shrinkage rate to prevent the delamination easily generated between the non-magnetic layer 50 and the ceramic body 10.

In addition, in the multilayer power inductor according to the embodiment of the present invention, the nickel (Ni) component included in the ferrite of the ceramic body 10 may be blocked from being diffused into the non-magnetic layer 50, or a component of the non-magnetic layer 50 may be blocked from being diffused into the ceramic body 10, such that it may have the DC-bias characteristics having a level similar to those of the related art even with a thickness corresponding to ½ of a thickness of the non-magnetic layer 50 according to the related art.

Therefore, the power inductor having a relatively decreased thickness may be manufactured.

In this case, the compound included in the non-magnetic layer 50 may further include a sintering agent.

The sintering agent may control the interface adhesion with the magnetic layer 30 to effectively prevent peeling between the magnetic layer 30 and the non-magnetic layer 50 which affects a yield of the multilayer power inductor.

Therefore, in the case in which electricity is applied to the multilayer power inductor, magnetic field is formed in the internal electrode layer 40. However, the non-magnetic layer 50 may completely block the magnetic field to significantly decrease the change in the inductance of the multilayer power inductor according to the temperature, thereby improving the bias-TCL characteristics.

Figure 3:
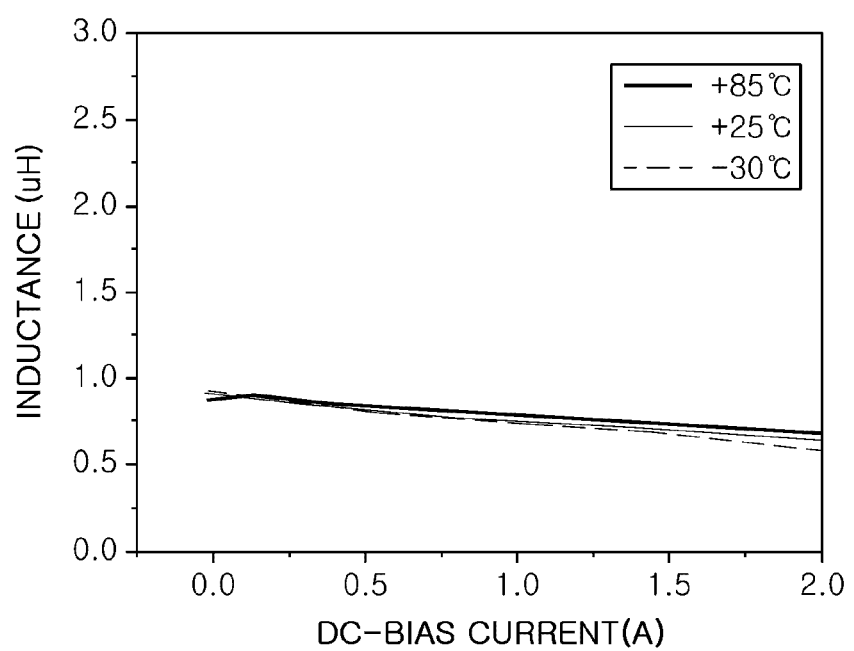
FIG. 3 is a graph showing an change in inductance after application of current according to a temperature of the ceramic electronic component according to the embodiment of the present invention.

FIG. 3 is a graph showing a change in inductance after application of current according to a temperature of the ceramic electronic component according to the embodiment of the present invention.

In FIG. 3, each of the data indicates data on a chip having the same size as that of the above-mentioned multilayer power inductor, formed of the same material as that of the above-mentioned multilayer power inductor, and having the same amount of coil turns as that of the above-mentioned multilayer power inductor. Meanwhile, FIG. 3 shows the rate of change in inductance by changing temperatures.

In FIG. 3, a thick line shows the inductance change at 85° C., a thin line shows the inductance change at 25° C., and a dotted-line shows the inductance change at −30° C.

That is, according to the embodiment of the present invention, it could be appreciated from FIG. 3 that a difference between an initial value and a value at high current, for each temperature, is not largely generated, such that the DC-bias characteristics are improved. In addition, inductance characteristics for each temperature are similar to each other, indicating that a large difference is not present in sizes of the magnetic layers to show characteristics of an ideal power inductor.

Figure 4A:
FIGS. 4A through 4C are process flow charts showing a method of manufacturing a ceramic electronic component according to the embodiment of the present invention.
Figure 4B:
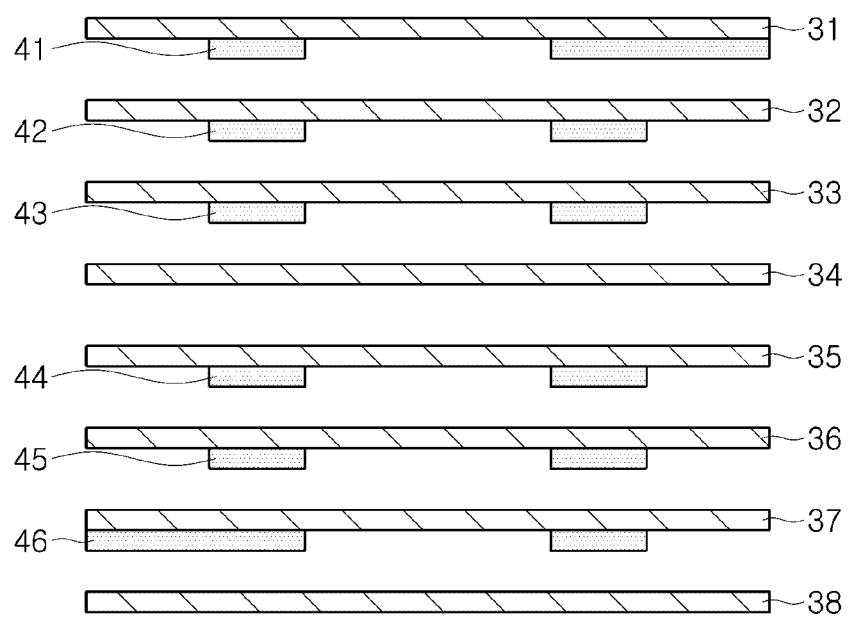
Figure 4C:
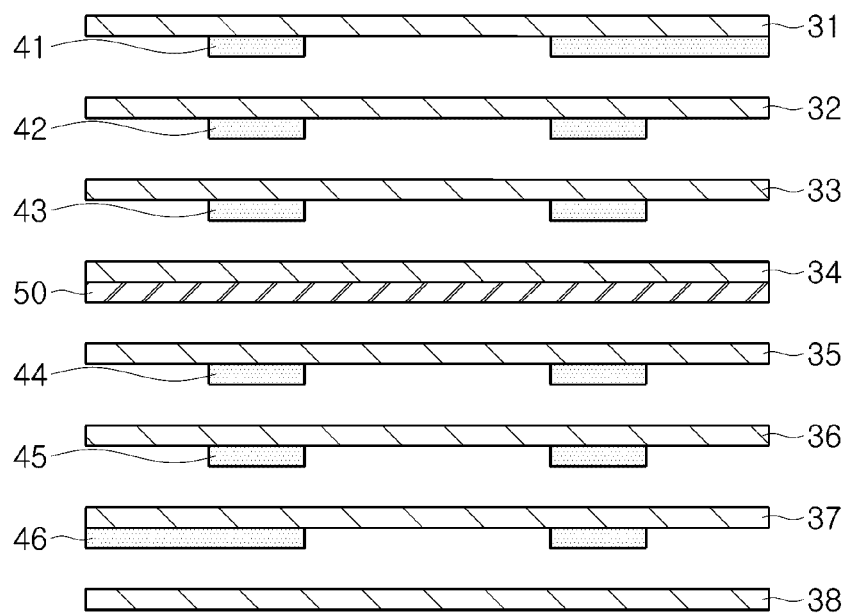

FIGS. 4A through 4C are process drawings illustrating a method of manufacturing a multilayer power inductor as an example of a ceramic electronic component according to an embodiment of the present invention.

Referring to FIG. 4A through FIG. 4C, in the method of manufacturing the multilayer power inductor according to the embodiment of the present invention, a plurality of magnetic layers 31, 32, 33, 34, 35, 36, 37, and 38 are first prepared.

Meanwhile, the number of the magnetic layers 30 of the present invention is not limited, and total number thereof may be changed depending on a purpose of the multilayer power inductor.

In addition, the magnetic layer 30 may be prepared by a general method. A material thereof may be $NiZnCuFe_2O_4$, and the like, but is not limited thereto.

Then, the non-magnetic layer 50 including the compound represented by $ZnCuTiO_4$ is prepared.

The non-magnetic layer 50 may be prepared using the above-mentioned non-magnetic composition. The compound may be prepared by a reaction of 10 to 50 mol % of zinc oxide (ZnO), 20 to 45 mol % of copper oxide (CuO), and 30 to 45 mol % of titanium dioxide ($TiO_2$). In this case, the average particle size of titanium dioxide may be prepared so as to be 0.2 μm or less.

Since the zinc (Zn) metal element in the non-magnetic composition controls diffusion of a titanium oxide ($TiO_4$) component, and due to the addition of the diffusion layer, the bias temperature characteristics change of the multilayer power inductor may be improved.

Meanwhile, since the metal element zinc (Zn) is included in both the magnetic layer 30 and the non-magnetic layer 50, the sintering adhesion of the diffusion layer may be highly increased.

Then, the internal electrode layers 41, 42, 43, 44, 45, and 46 are respectively formed in the magnetic layers 31, 32, 33, 34, 35, 36, 37, and 38.

In this case, the internal electrode layer 40 may be formed by a general method. A material thereof may include any one of silver (Ag) and copper (Cu), or an alloy thereof, but is not limited thereto.

In addition, each of the internal electrode layers 41, 42, 43, 44, 45, and 46 may be connected to each other by via electrodes (not shown), thereby having a coil structure.

Then, the non-magnetic layer 50 may be inserted between the plurality of the magnetic layers 34 and 35 to form a multilayered body.

The non-magnetic layer 50 may exhibit complete non-magnetic characteristics, thereby significantly decreasing the inductance change after the application of current according to the temperature.

In this case, the non-magnetic layer 50 may be inserted between the magnetic layers 31, 32, 33, 36, 37, and 38 different from the shown magnetic layers, if needed. In addition, in some case, the plurality of non-magnetic layers 50 may be inserted between the plurality of magnetic layers 31, 32, 33, 34, 35, 36, 37, and 38 to form the multilayered body.

Then, the multilayered body is fired to form the ceramic body 10.

In this case, the sintering agent may be further included in preparing the non-magnetic layer 50, such that the sintering adhesion is improved between the magnetic layer 30 and the non-magnetic layer 50 in the firing process to prevent peeling between the magnetic layer 30 and the non-magnetic layer 50, thereby improving the yield of the multilayer ceramic power inductor.

Then, the external electrode 20 may be formed on external surfaces of the ceramic body 10 so as to be electrically connected to at least one of the internal electrode layers 41, 42, 43, 44, 45, and 46, thereby manufacturing the multilayer power inductor.

As set forth above, according to the embodiment of the present invention, the non-magnetic layer to which the non-magnetic composition is applied may be inserted into the middle of the magnetic layer to block the flow of the magnetic field generated at the time of the application of current, such that the inductance decreasing rate at the relatively high current and the capacitance rate of change of the magnetic body after the application of current according to the temperature change are insensitive, whereby the stable operational characteristics of the ceramic electronic component may be secured.

While the present invention has been shown and described in connection with the embodiments, it will be apparent to those skilled in the art that modifications and variations may be made without departing from the spirit and scope of the invention as defined by the appended claims.

What is claimed is:

1. A non-magnetic composition for a ceramic electronic component including:
   a compound represented by $ZnCuTiO_4$ of a spinel type,
   wherein the compound includes 10 to 50 mol % of zinc oxide (ZnO), 20 to 45 mol % of copper oxide (CuO), and 30 to 45 mol % of titanium dioxide (TiO2), and
   an average particle size of the titanium dioxide is 0.2 μm or less.

2. A ceramic electronic component comprising:
   a ceramic body having a plurality of magnetic layers multilayered therein;
   internal electrode layers formed in the ceramic body;
   a non-magnetic layer inserted into at least one position between the magnetic layers and including a compound represented by $ZnCuTiO_4$ of a spinel type; and
   external electrodes formed on external surfaces of the ceramic body and electrically connected to the internal electrode layers,
   wherein the compound includes 10 to 50 mol % of zinc oxide (ZnO), 20 to 45 mol % of copper oxide (CuO), and 30 to 45 mol % of titanium dioxide (TiO2)), and
   an average particle size of the titanium dioxide is 0.2 μm or less.

3. The ceramic electronic component of claim 2, wherein the internal electrode layer is formed of a material including silver (Ag) or copper (Cu).

4. The ceramic electronic component of claim 2, wherein the external electrode is formed of a material including silver (Ag) or copper (Cu).

5. The ceramic electronic component of claim 2, wherein the ceramic electronic component is any one chip element of a chip inductor, a power inductor, a chip bead, a chip antenna, and a chip LC filter.

6. A manufacturing method of a ceramic electronic component, comprising:
   preparing a plurality of magnetic layers;
   preparing non-magnetic layers including a compound represented by $ZnCuTiO_4$ of a spinel type;
   forming internal electrode layers on the magnetic materials, respectively;
   inserting the non-magnetic layer into at least one position between the magnetic layers to form a multilayered body;
   firing the multilayered body to form a ceramic body; and
   forming external electrodes on external surfaces of the ceramic body so as to be electrically connected to the internal electrode layers,
   wherein in the preparing of the non-magnetic layer, the compound is prepared by a reaction of 10 to 50 mol % of zinc oxide (ZnO), 20 to 45 mol % of copper oxide (CuO), and 30 to 45 mol % of titanium dioxide (TiO2), and
   in the preparing of the non-magnetic layer, the compound is prepared so that an average particle size of the titanium dioxide is 0.2 μm or less.

* * * * *